United States Patent [19]
Dawson et al.

[11] Patent Number: 5,940,291
[45] Date of Patent: Aug. 17, 1999

[54] LOW-COMPLEXITY ADAPTIVE CONTROLLER

[75] Inventors: Joel L. Dawson, Woodbridge, Va.; Jenshan Lin, Pine Brook; Young-Kai Chen, Berkeley Heights, both of N.J.

[73] Assignee: Lucent Technologies Inc., Murray Hill, N.J.

[21] Appl. No.: 08/853,083

[22] Filed: May 8, 1997

[51] Int. Cl.$^6$ .................................................. G05B 13/02
[52] U.S. Cl. ............................. 364/148.01; 364/148.01; 364/165; 364/166; 375/316; 375/345
[58] Field of Search .................................. 364/165, 166, 364/146, 147, 148.1, 148.01, 148.02, 148.03, 148.04, 148.05, 148.06, 148.07, 148.08, 148.09; 455/234.1, 245.1, 723; 375/455, 341, 316, 355; 348/678, 685

[56] References Cited

U.S. PATENT DOCUMENTS

| | | | |
|---|---|---|---|
| 4,075,538 | 2/1978 | Plunkett | 318/52 |
| 4,685,083 | 8/1987 | Leuschner | 365/185 |
| 4,748,684 | 5/1988 | Wright, Jr. | 455/182 |
| 5,399,960 | 3/1995 | Gross | 323/313 |
| 5,563,916 | 10/1996 | Scarpa | 375/345 |
| 5,619,166 | 4/1997 | Gross | 327/552 |
| 5,666,045 | 9/1997 | Grodevant | 323/282 |
| 5,784,410 | 7/1998 | Nakano | 375/345 |

OTHER PUBLICATIONS

Leszek A. Trybus, Extremum Controller Design, IEEE Transactions on Automatic Control, Jun. 1976, pp. 388–391.

M. H. Hamza, Extremum Control of Continous Systems, IEEE Transactions on Automatic Control, Apr. 1966, pp. 182–189.

Tayeb A. Denidni and Gilles Y. Delisle, A Nonlinear Algorithm for Output Power Maximization of an Indoor Adaptive Phase Array, IEEE Transactions on Electromagnetic Compatability, May 1995, pp. 201–209.

*Primary Examiner*—William Grant
*Assistant Examiner*—Ramesh Patel

[57] ABSTRACT

In accordance with one embodiment of the present intention, an adaptive feedback controller is configured to substantially reduce an error control signal defined by the difference between a command signal and the output signal of a controlled device. The adaptive controller comprises a step generator circuit configured to provide a control signal which is employed to vary the input signal received by the controlled device, The control signal is substantially in the shape of a ramp signal having a given slew rate. An adaptive slew rate computation circuit is coupled to the step generator so as to provide a slew rate compensation signal to the step generator to increase the slew rate of the control signal, when the controlled device is responding to a substantially fast varying input signal. The slew rate compensation circuit decreases the slew rate of the control signal, when the controlled device is responding to a slow varying input signal.

25 Claims, 5 Drawing Sheets

LOW-COMPLEXITY ADAPTIVE CONTROLLER

FIELD OF THE INVENTION

This invention relates to an adaptive feedback control mechanism and more specifically to an adaptive feedback system employed in a communications receiver so as to substantially reduce the loss of information in a signal fading environment.

BACKGROUND OF THE INVENTION

One of the design challenges in mobile communication receivers, such as personal communication terminals, PCTs, and mobile cellular phones, is dealing with signal fading due to signals propagating to a receiver through various paths. These paths are referred to as multipaths leading to what is known as multipath propagation.

One of the problems with multipath propagation in wireless communication systems is the fading caused by reflection and scattering of radio signals from buildings, trees and other obstacles along the radio path. Radio waves or signals arrive at a mobile receiver from many different directions, with different time delays or phase lags. Direct signal rays, ground signal rays and other possible scattered rays combine vectorially at the receiver antenna to give a resultant signal which depends on the differences in path length that exist in the multipath field.

The amplitudes and phases of signals received from a transmitter through different multipaths of a channel are generally independent of each other. Because of complex addition of multipath signals, the strength of received signals may vary between very small and moderately large values. Thus fading is commonly referred to as the phenomenon of received signal strength variation due to complex addition of multipath signals. In a fading environment, points of very low signal strength, or deep fades, are separated by approximately one-half of a signal wavelength from each other. Typically, multipath fading in a wireless communications environment can create 20–30 dB deep fades and deteriorate signal-to-noise (SNR) ratio at the cellular handsets, which causes poor voice quality.

One approach to overcome the fading problem is disclosed in a United States pending application, Ser. No. 08/741,999, (Chen 1-1-4), filed on Oct. 14, 1996 and assigned to the same assignee as the current application, which is incorporated herein by reference. Basically, the prior system employs in a wireless receiver a first and second antenna, with each antenna receiving a corresponding signal. Typically, the second antenna is located one quarter to one half phase away from the first antenna. A phase shifter is configured to shift the phase of the signal received by the second antenna in RF (Radio Frequency) stage. As well, means for combining the first and second signals in the RF stage is provided. Power detection means for detecting the combined power for the first and second signals is utilized. An adaptive controller means controls the phase of the phase shifter so that the phase shifter shifts the phase of the second signal such that the power of the first and second signals are constructively combined.

However, in certain circumstances, the constructive combination of the two signals from each one of the antennas may lead to the saturation of amplifiers employed in the front end stage of the receiver. For example, when the received signals are in-phase, their constructive combination results in a signal having an amplitude twice as large as that of only one of the received signals. Prior art systems require a specifically designed attenuator so that the power level of the received combined signals do not exceed a given threshold above which results in amplifier saturation.

Furthermore, in a rapidly signal-changing environment, there is a need to track signal variation at a substantially rapid speed, whereas, in a slowly signal-changing environment, it is desirable to maintain a substantially accurate tracking. Prior art systems do not teach or provide a feedback control arrangement that allows for such adaptive tracking of fading signals.

Thus, there is a need for an adaptive controller that is capable of efficiently tracking rapidly varying signal conditions without sacrificing accuracy. It is also preferable to maintain the power level of the received combination signal below a given threshold without the need for a specifically designed attenuator.

SUMMARY OF THE INVENTION

Briefly, in accordance with one embodiment of the present invention, a communications receiver comprises at least two antennas for receiving fading signals. A phase shifting circuit is coupled to at least one of the antennas to change the phase of a signal received in the antenna. A signal combiner combines the signals received from the antennas and provides the combined signal to an adaptive controller. The adaptive controller is configured to receive an error control signal, which represents the magnitude of the error between a command signal and the combined antenna signal. A step generator responsively generates a control signal having a given slew rate that varies in a given direction to substantially decrease the magnitude of the error control signal. The adaptive controller further comprises a sign detector that determines the magnitude of change of the error signal, and generates a change-direction signal, when the error control signal is increasing. A transient detect circuit is configured to generate a fast transient indication signal, when the antennas receive a fast transient signal, in response to which the slew rate of the control signal is increased. The adaptive controller further comprises a slow adaptive response circuit so as to adjust the slew rate of the phase shift control signal in response to slow fading signals received by the antennas.

Briefly, in accordance with another embodiment of the invention a method for adaptively controlling a plant process comprises the steps of providing a control signal that varies in a given direction in accordance with a given slew rate, The output signal generated by the plant is subtracted from a command signal level so as to periodically evaluate the resulting error signal. The slew rate of the control signal increases when the input signal to the plant process is a fast transient. The slew rate of the control signal decreases when the input signal to the plant process is a slowly varying signal.

In accordance with a further embodiment of the invention the adaptive control method comprises the step of monitoring the magnitude of a derivative signal corresponding to the derivative of the control signal and continuously adjusting the slew rate of the control signal based on a time average of the magnitude of the derivative signal.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE INVENTION

Figure 1:
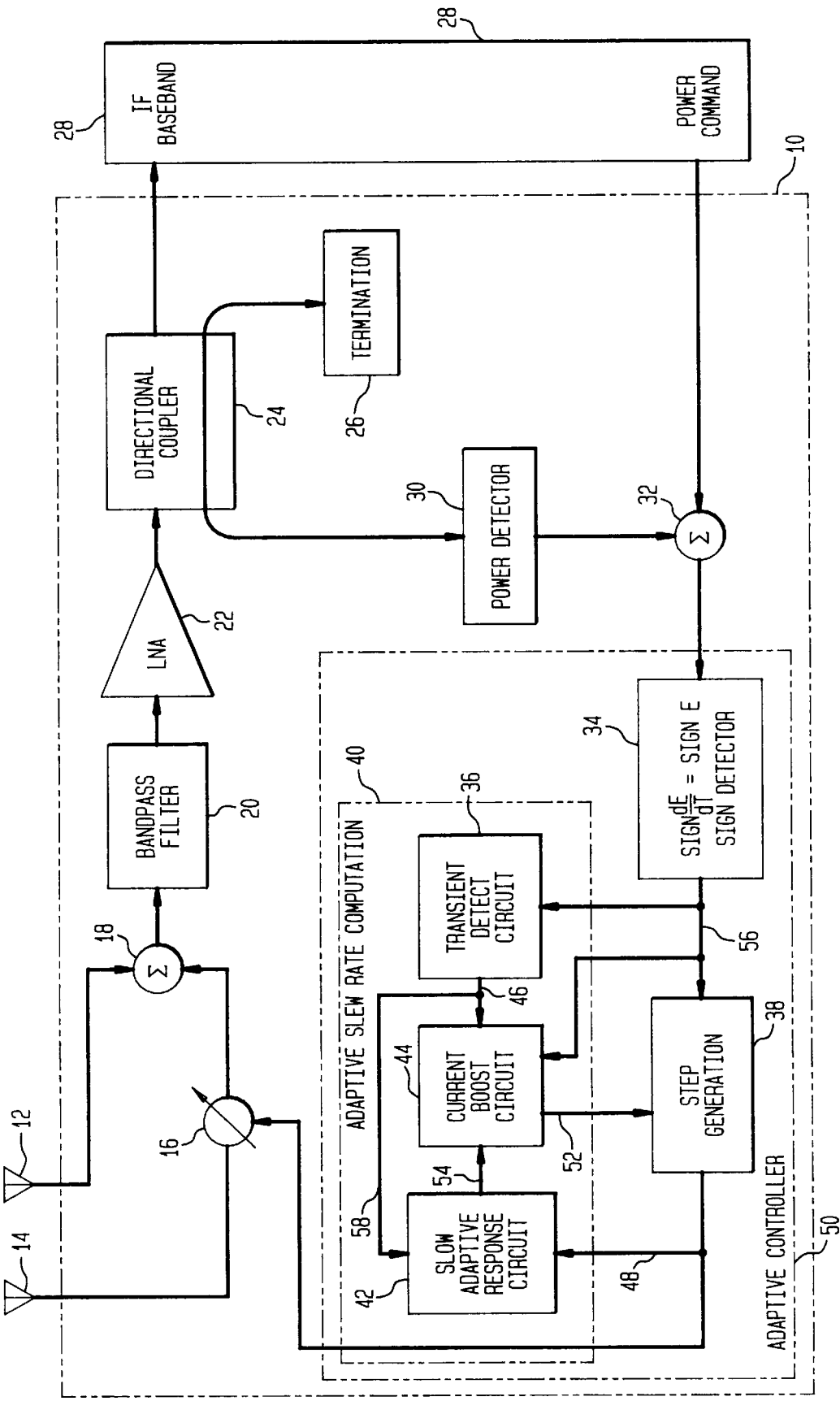
FIG. 1 is a block diagram of an adaptive controller in accordance with one embodiment of the present invention.

FIG. 1 illustrates a communications antenna system 10 that employs an adaptive controller 50 in accordance with one embodiment of the present invention, although the invention is not limited in scope to the arrangement illustrated in FIG. 1. For example, an adaptive controller in accordance with the principles of the present invention may be employed in a variety of plants or controlled devices that respond to an input signal and provide an output signal.

A diversity antenna system comprising of antennas 12 and 14 is configured to receive signals transmitted from a variety of communications sources. The output terminal of antenna 12 is coupled to an input terminal of a combiner 18. The output terminal of antenna 14 is coupled to an input terminal of a phase shifter 16, which is configured to receive a control signal at its second input terminal. The output terminal of phase shifter 16 is coupled to a second input terminal of combiner 18.

The output terminal of combiner 18 is coupled to an input terminal of a bandpass filter 20, which is configured to respond to a given frequency range. The output terminal of bandpass filter 20 is coupled to an input terminal of a low noise amplifier 22, which is configured to amplify the signals received by antennas 12 and 14. The output of low noise amplifier 22 is coupled to the input terminal of a directional coupler 24. Directional coupler 24 is configured to transfer a substantial portion of the signal received from amplifier 22 to an intermediate frequency, IF, baseband system 28 for further signal processing. Directional coupler 24 transfers a small portion of the signal received from amplifier 22 to the input terminal of a power detector 30. Power detector 30 provides a signal corresponding to the signal level detected by antennas 12 and 14.

The output terminal of power detector 30 is coupled to an input terminal of a combiner 32. The other input terminal of combiner 32 is configured to receive a command signal level, for example from the baseband system 28. It is noted that the command signal may also be derived from a fixed reference voltage signal source. The command signal level essentially sets the level of the gain control at the receiving antennas.

The output terminal of combiner 32 provides an error control signal, which is the difference between the command signal and the output signal of power detector 30. Adaptive controller 50 in accordance with one embodiment of the present invention is configured to receive the error control signal at its input terminal. Adaptive controller 50 is configured to minimize the magnitude of this error control signal.

Adaptive controller 50 comprises a sign detector 34, which is configured to receive the error control signal at its input terminal. Sign detector 34 compares the sign of the derivative of error control signal with the sign of the error control signal. When the signs are the same, the magnitude of error is increasing, and sign detector 34 generates a change-direction signal such as a logical "1," as will be explained in more detail hereinafter. When the signs are opposite, the magnitude of error is decreasing. The change-direction signal remains the same, such as a logical "0," as long as the magnitude of error is decreasing.

Adaptive controller 50 further comprises a step generator 38, which is configured to receive the change-direction signal at its input terminal via line 56. In accordance with one embodiment of the present invention, step generator 38 provides a control signal in a shape of a linearly increasing or decreasing ramp signal to an input terminal of phase shifter 16, although the invention is not limited in scope to such a control signal.

Adaptive controller 50 further comprises an adaptive slew rate computation circuit 40, which is configured to control the slew rate of the control signal generated by step generator 38. The adaptive slew rate computation circuit is configured to perceive whether communication system 10 is responding to a rapidly varying or fast transient input signal, or whether it is responding to a slowly varying or steady-state input signal. Adaptive slew rate computation circuit 40 is configured to receive the change-direction signal from the output terminal of sign detector 34. A transient detect circuit 36 is configured to receive the change direction signal via line 56. The output terminal of transient detect circuit is coupled to a current boost circuit 44, via line 46. An output terminal of step generator 38 is coupled to an input terminal of a slow adaptive response circuit 42, which in turn is coupled to another input terminal of current boost circuit 44, via line 54. An output terminal of current boost circuit 44 is coupled to an input terminal of step generator 38. Finally, the output terminal of transient detect circuit 36 is also coupled to an input terminal of slow adaptive response circuit 42.

The slew rate of the control signal varies depending on the condition of the signals received at antennas 12 and 14. For example, when controller 50 perceives a fast transient environment resulting from a deep fade, the slew rate of the control signal increases substantially, allowing the controller to track the abrupt change. On the other hand, when controller 50 perceives a slow transient environment or a steady-state condition, the slew rate of the control signal decreases substantially. During operation, adaptive slew rate computation circuit 40 provides a slew rate compensation signal to step generator 38 via line 52 so as to vary the slew rate of the control signal generated by adaptive controller 50.

For slow varying error condition, an input terminal of adaptive slew rate computation circuit 40 receives the generated control signal via line 48, and continuously monitors the magnitude of the derivative of the control signal. In response it provides to the current boost circuit a current signal which corresponds to the time average of the first derivative of the control signal. Current boost circuit 44 continuously adjusts the slew rate of step generator 38 based on the measured time average of the first derivative of the control signal, as will be explained further in reference with FIG. 4.

Transient detect circuit 36 is configured to receive the change-direction signal at its input terminal, so as to detect a fast transient condition. As will be explained in more detail in reference with FIG. 3, in accordance with one embodiment of the present invention, transient detect circuit 36 is configured such that it perceives a fast transient condition, when the change-direction signal remains, for example at logical "0" for a given period of time, indicating that the error control signal is decreasing for that period of time. As such, it may be assumed that controller 50 is attempting to track an abrupt change in the error control signal. Transient detect signal 36 generates a fast transient indication signal to an input terminal of current boost circuit 44 via line 46.

The operation of the adaptive controller 50 is described hereinafter in reference with FIG. 1. Controller 50 receives the error control signal from the output terminal of combiner 32. Sign detector 34 determines whether the error control signal is decreasing or increasing. If the error control signal is increasing, sign detector 34 provides a change-direction signal to step generator 38 so as to reverse the direction of slope of the ramp signal generated by step generator 38. For example, if the step generator was generating ramp signals that increase linearly in time, change-direction signal causes the step generator to generate ramp signals that decrease linearly in time.

Transient detect circuit 36 continuously monitors the change-direction signal, generated by sign detector circuit 34. If the sign of change-direction signal has not changed for a given period of time, controller 50 operates based on the assumption that system 10 is responding to an abrupt input signal change, such as the one encountered during transition from a minor signal fading environment to a deep signal fading environment. In this case, transient detect circuit 36 provides a fast transient indication signal to current boost circuit 44. In response, current boost circuit 44 provides an additional current signal, or slew rate compensation signal, to step generator 38 so as to increase the slew rate of the control signal generated by step generator 38. This allows the controller to track the abrupt change faster leading to a substantially short recovery time. During this period, where a fast transient has been detected, transient detect circuit 36 provides a slow adaptation disable signal to slow adaptive response circuit 42, via line 58, so as to disable the operation of the slow adaptative response circuit 42. In response, slow adaptative response circuit 42 substantially discontinues to provide a current signal to current boost circuit 44.

If, however, the transient detect circuit does not perceive or detect an abrupt change in the input signal, controller 50 operates based on the assumption that it is tracking in a slow varying signal environment, and thus the system is in a steady state condition. During this time, slow adaptive response circuit 42 receives the control signal generated by step generator 38 via line 48. In response, circuit 42 takes a time average of the first derivative of the control signal. The time average signal is a DC voltage with a magnitude that corresponds to the rate of change of the control signal. The time average signal generated by circuit 42 is then provided to current boost circuit 44 via line 54. The current boost circuit adjusts the slew rate of step generator 38 so that controller 50 tracks the input signal appropriately.

It is noted that the invention is not limited in scope to the embodiment described in reference with FIG. 1. Thus, a control arrangement in accordance with the principles of the present invention may be implemented for controlling a device or a plant, in a variety of systems that respond to an unknown input signal that may have both fast and slow variations. The output of the controller, which is the input of the device being controlled or the plant, increases or decreases linearly. The output of the plant is subtracted from a given command level, and the resulting error signal is periodically evaluated. If the magnitude of error is observed as increasing, the controller changes the direction of the control signal.

When the controller perceives a steady-state condition, the output of the controller exhibits a small amplitude oscillation about the desired value of the plant output signal. Furthermore, the slew rate of the control signal at the output of the controller depends on the variation in the input signal. When the controller perceives a rapidly varying input signal, the slew rate of the controller is increased so as to allow a substantially fast tracking response. However, in response to a slow varying input signal, the slew rate of the controller is decreased so as to allow steady state tracking, with a high degree of accuracy. It is noted that controller 50 may be configured to detect what is perceived to be a fast transient environment or a steady state condition, in accordance with system requirements. Thus, the system designer first defines the signal variations that should be categorized as fast transient and steady-state. Thereafter, controller 50 is configured to perceive a fast transient when it receives a signal that falls within the predefined conditions of a fast transient environment. When no fast transient environment is detected, controller 50 operates based on the assumption that it is responding to a steady state condition. However, it is noted that the invention is not limited in scope in the manner that such detection is accomplished in accordance with the embodiments described herein.

Figure 2:
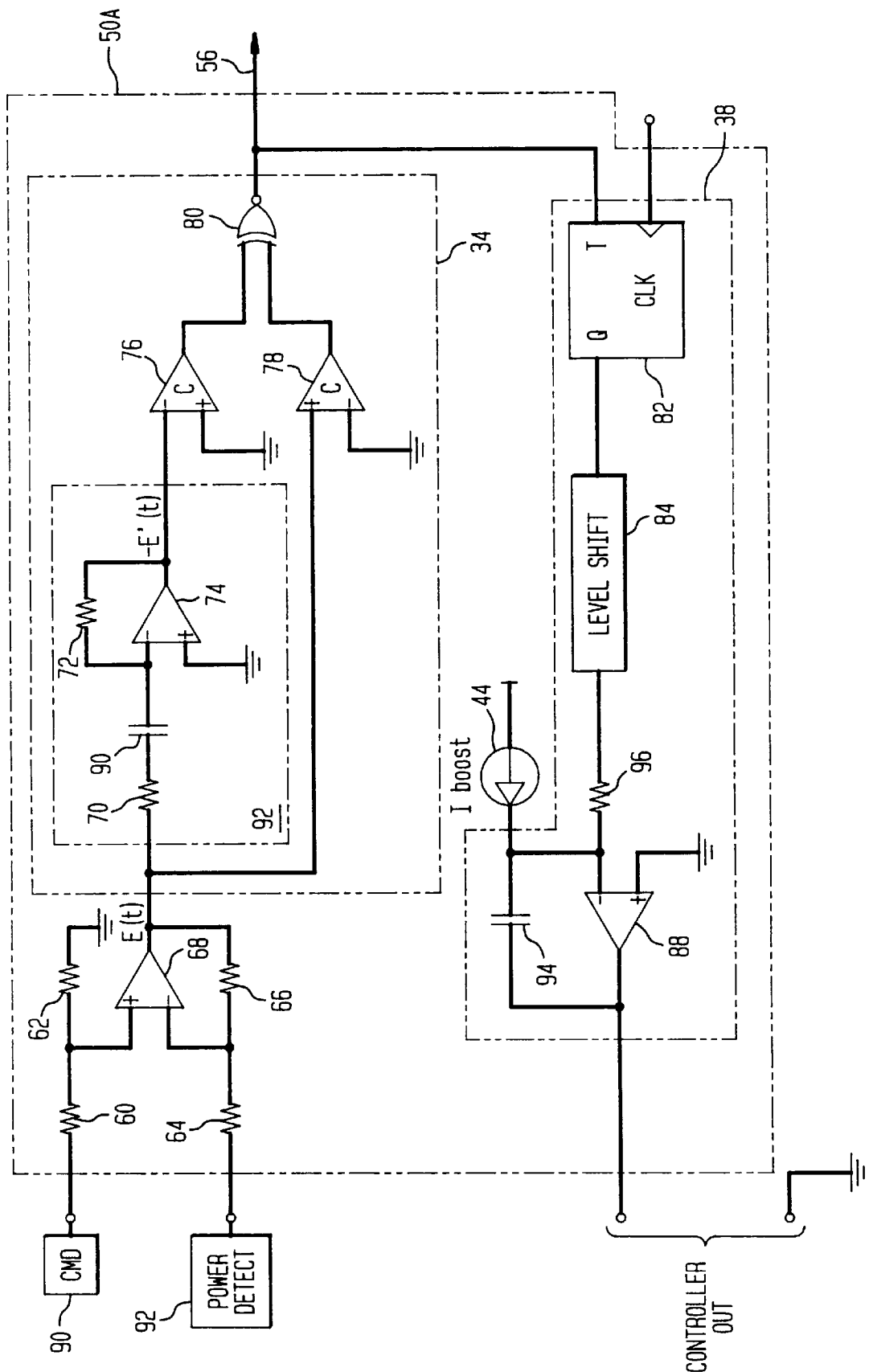
FIG. 2 is a schematic diagram of an adaptive controller illustrated in FIG. 1 in accordance with one embodiment of the invention.

The embodiment described in reference with FIG. 1 is further explained in reference with FIGS. 2–5. FIG. 2 illustrates a schematic diagram of an adaptive controller 50A in accordance with one embodiment of the present invention. Controller 50A includes an operational amplifier 68, which is configured to receive a command signal at terminal 90 and a power detect signal at terminal 92. Operational amplifier 68 and resistor network 60,62,64 and 66 form a subtracter circuit so as to generate an error control signal $E(t)$ at the output terminal of amplifier 68.

The output terminal of operational amplifier 68 is coupled to an input terminal of a sign detector circuit 34. Sign detector circuit 34 comprises an analog differentiator 92, which is configured to measure the derivative of the error control signal generated by amplifier 68. The analog differentiator further comprises an operational amplifier 74, a capacitor 90 and resistors 70 and 72. Sign detector circuit 34 also includes two buffer circuits 78 and 76, which are configured to receive the error control signal and its derivative respectively.

An exclusive NOR gate 80 is configured to receive the error control signal and its derivative from buffer circuits 78 and 76, to determine whether the sign of the error signal is the same as the sign of its derivative signal. Exclusive NOR gate 80 provides a change-direction signal when the error control signal is increasing. Thus, when the sign of the error signal is the same as the sign of its derivative, the output signal of exclusive NOR gate 80 goes to "1," indicating that the system error is increasing. If, however the sign of the error control signal is opposite the sign of its derivative signal, the output signal of exclusive NOR gate 80 goes to "0," indicating that the system error is decreasing, and change-direction signal remains "low."

The output of exclusive NOR gate 80 is coupled to an input terminal of a step generator 38. Step generator 38 comprises a toggle flip-flop 82 that is configured to receive the output signal of exclusive NOR gate 80. The clock terminal of toggle flip-flop 82 is configured to receive a system clock pulse signal, whose frequency depends, among other things, on the frequency of signals the system is intended to respond. The output terminal of toggle flip-flop 82 is coupled to an input terminal of a signal level shifter 84, which is provided to substantially reduce floating errors.

When the output of toggle flip-flop 82 is "1," level shifter 84 provides a given positive voltage signal level. Conversely, when the output of the toggle flip-flop is "0," level shifter 84 provides a given negative voltage signal level.

The output terminal of level shifter 84 is coupled to an input terminal of an operational amplifier 88 via an input resistor 94. The output terminal of operational amplifier 88 is coupled to its inverting terminal via a feedback capacitor. Operational amplifier 88 functions as a ramp generator. When the output of level shifter 84 is a positive signal, operational amplifier 88 provides an output control signal that ramps down. Conversely, when the output of level shifter 84 is a negative signal, operational amplifier 88 provides an output control signal that ramps up. The output terminal of operational amplifier 88 is coupled to a controller output terminal, which provides a control signal to phase shifter 16 (FIG. 1).

Operational amplifier 88 is also configured to receive a slew rate compensation current signal from a current boost circuit 44 at its inverting terminal. Depending on the current signal level generated by current boost circuit 44, the slope of the signal ramp generated by operational amplifier 88 varies. For example, when the slope of the signal ramp increases, controller 50A is able to track abrupt changes, whereas when the slope of the signal ramp decreases, controller 50A is able to track a steady state condition in a substantially accurate manner.

As illustrated in FIG. 2, the voltage signal received by operational amplifier 88 may be either positive or negative. The period of the ramp signal generated by operational amplifier 88 is substantially equal to the system clock cycle. By varying the system clock rate and the slope of the ramp signal, it is possible to control the amplitude of control fluctuation about a desired value. The tracking speed, or the ability of controller 50 to track a rapidly varying input signal, depends among other things, on the chosen rate of change during a step. A substantially fast controller may have a high slope during each step, and a fast clock to keep the controller output signal substantially focused about a desired value.

The allowable clock frequency is limited, among other things, on the bandwidth of differentiator 92. This limit forces a tradeoff between tracking speed and steady-state error. However, this tradeoff is substantially eliminated by introducing the slew rate compensation current signal generated by boost current circuit 44. The direction of the slew rate compensation current signal is the same as the direction of the ramp signal generated by operational amplifier 88. The magnitude of the slew rate compensation current signal, as described in detail with reference with FIG. 5, depend among other things, on the time average of the first derivative of the control output signal generated by controller 50. The transient detect circuit allows the controller to make a sudden change in step size in response to a perceived fast transient. This adaptive behavior provides a remarkable improvement in the controller tracking speed, with substantially no corresponding increase in steady-state error.

Figure 3:
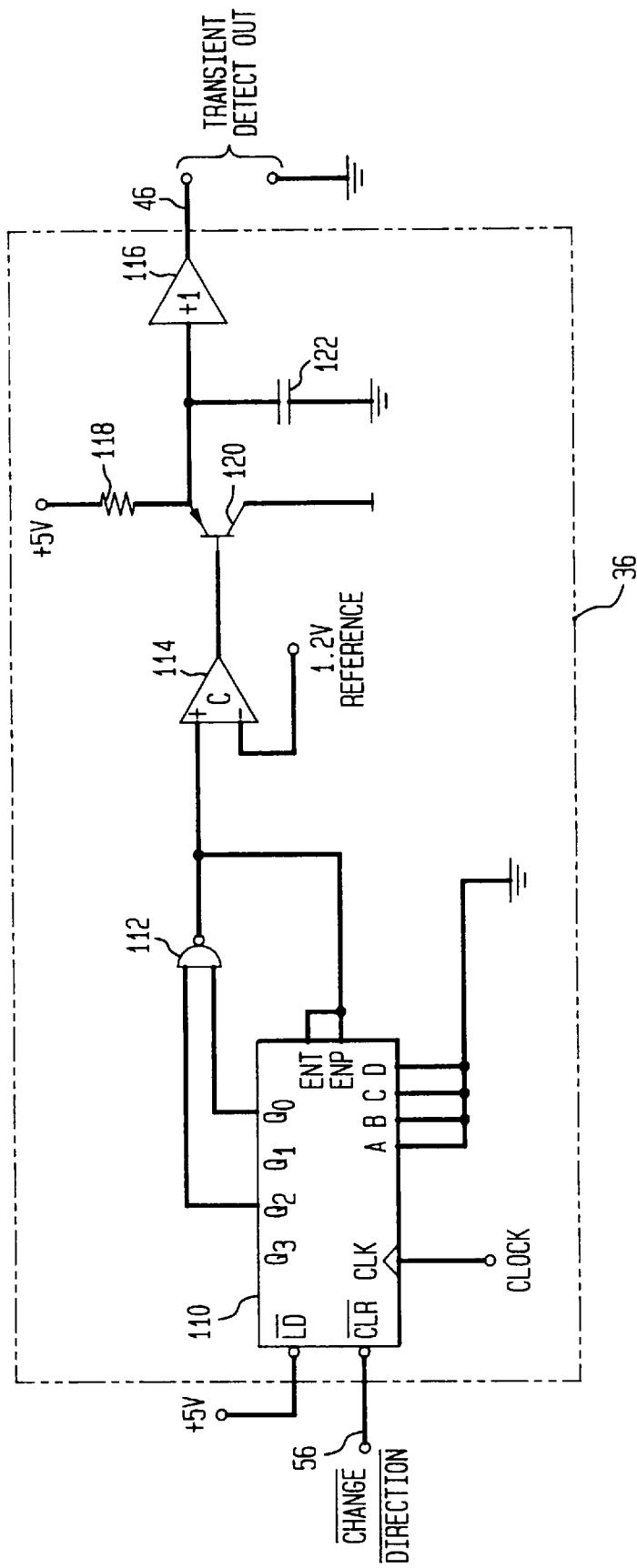
FIG. 3 is a schematic diagram of a transient detect circuit employed in an adaptive controller in accordance with one embodiment of the present invention.

FIG. 3 illustrates a schematic diagram of a transient detect circuit 36 in accordance with one embodiment of the present invention, although the invention is not limited in scope to this arrangement of a transient detect circuit. A counter 110 is configured to receive at its clear CLR terminal, the change-direction signal via line 56 (FIGS. 1 and 2). Counter 110 is further configured to receive the system clock pulses at its clock terminal. Counter 110 continues counting, as long as the change-direction signal remains "low," indicating that the error control signal level is decreasing.

The output terminals of counter 110 are coupled to a NAND gate 112. The output terminal of NAND gate 112 is further coupled to the ENT terminal of counter 110. The output terminal of NAND gate 112 is also coupled to a comparator 114, which typically comprises an operational amplifier such as 114. The output of operational amplifier 114 is coupled to a one-shot multivibrator, which includes transistor 120, bias resistor 118, load capacitor 122 and a buffer 116. The output terminal of buffer 116 provides a transient detect signal via line 46 (FIG. 1).

Thus, during operation, counter 110 begins counting once it senses that change-direction signal is "low." Counter 110 continues the count until it reaches a given number, such as count 5 in the embodiment illustrated in FIG. 3. If the counter reaches this given count, the system assumes that a fast transient condition has occurred as explained before. In response, the output of NAND gate 112 goes "low" and as a result counter 100 freezes, indicating that the system is still responding in a fast transient environment. Comparator 114 compares the output of NAND gate 112 with a reference voltage signal level, in order to assure that the transient detect signal is not generated by a floating signal. When the output of comparator 114 goes "low," capacitor 122 begins to charge and thus the transient detect signal remains asserted for a period of time sufficient for the remaining components of the system to sense a transient condition. Once the polarity of the change-direction signal reverses, counter 110 is reset, indicating that the fast transient condition has ended.

Figure 4:
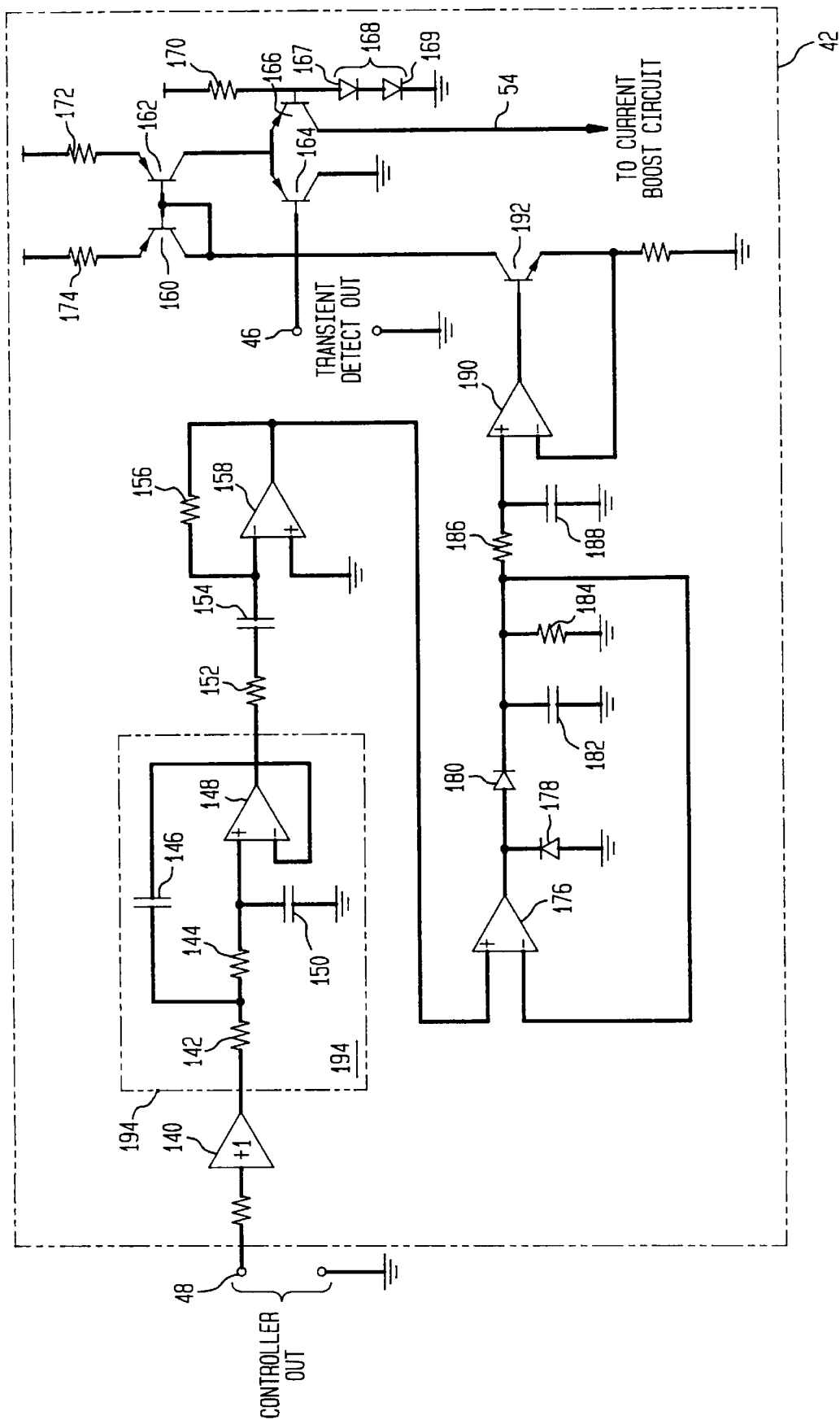
FIG. 4 is a schematic diagram of a slow adaptive response circuit employed in an adaptive controller in accordance with one embodiment of the present invention.

FIG. 4 illustrates a schematic diagram of a slow adaptive response circuit 42 in accordance with one embodiment of the present invention, although the invention is not limited in scope to such a slow adaptive response circuit arrangement. As explained before, slow adaptive response circuit 42 responds to the control signal generated by controller 50 (FIG. 1) so as to measure the time average of the first derivative of the control signal.

Slow adaptive response circuit is configured to receive the control signal at its input terminal via line 48. In a preferred embodiment of the invention, a low pass filter 194 is configured to receive the control signal via a buffer 140. The low pass filter comprises an operational amplifier 148, and two capacitors 146 and 150 and resistors 142 and 144. The non-inverting terminal of operational amplifier 148 is coupled to ground via capacitor 150. The inverting terminal of operational amplifier 148 is coupled to its output terminal, and further to a capacitor 146. Capacitor 146 is coupled to the non-inverting terminal of operational amplifier 148 via resistor 144. The low pass filter is employed to substantially eliminate noise.

The output of the low pass filter is coupled to an input terminal of the inverting terminal of operational amplifier 158 via a resistor 152 and capacitor 154. The output terminal of operational amplifier 158 is coupled to the inverting terminal vial a resistor 156. The non-inverting terminal of operational amplifier 158 is coupled to ground. Operational amplifier 158 and capacitor 154 and resistor 156 form a differentiator, which is configured to provide a voltage signal representing the first derivative of the control signal generated by controller 50.

The output terminal of operational amplifier 158 is coupled to the non-inverting terminal of an operational amplifier 176. The inverting terminal of operational amplifier is coupled to its output terminal via a diode 180. A diode 178 couples the output terminal of operational amplifier 176 to ground. Furthermore, diode 180 is coupled to ground via a capacitor 182, which is in a parallel arrangement with a resistor 184. Operational amplifier 176 functions as a peak detector that provides a signal which corresponds to the time average of the first derivative signal provided by differentiator 158.

The output of operational amplifier 176 is coupled to a transistor 192 via a buffer amplifier 190. Transistor 192 is coupled to a transistor pair 164, 166 via a current mirror circuit comprising transistors 160 and 162. The base terminal of transistor 164 is configured to receive the transient detect signal via line 46. The base terminal of transistor 166 is coupled to a reference voltage level 168 formed by two diodes 167 and 169 respectively. The current generated at the collector terminal of transistor 166 corresponds to the current signal generated at the collector terminal of transistor 192 and represents the time average of the first derivative of the control signal generated by controller 50. This current is provided to current boost circuit 44 via line 54.

During operation, slow adaptive response circuit 42 generates a boost current signal, vial line 54, which is a function of at least the time average of the first derivative of the output control signal. It is noted that the slow adaptive response circuit preferably responds in a time scale that is not close to the system clock frequency. Thus, the average of the first derivative signal is taken over a period of time which is substantially longer than the period of the system clock. When the transient detect signal at line 46 is "high", pnp transistor 164 turn on and conducts the current to ground. Thus, slow adaptive response circuit provides substantially no current, when the controller 50 (FIG. 1) is responding in a fast transient environment. However, when the transient detect signal at line 46 is "low" pnp transistor 164 is turned "off" and the boost current signal flows through transistor 166.

Figure 5:
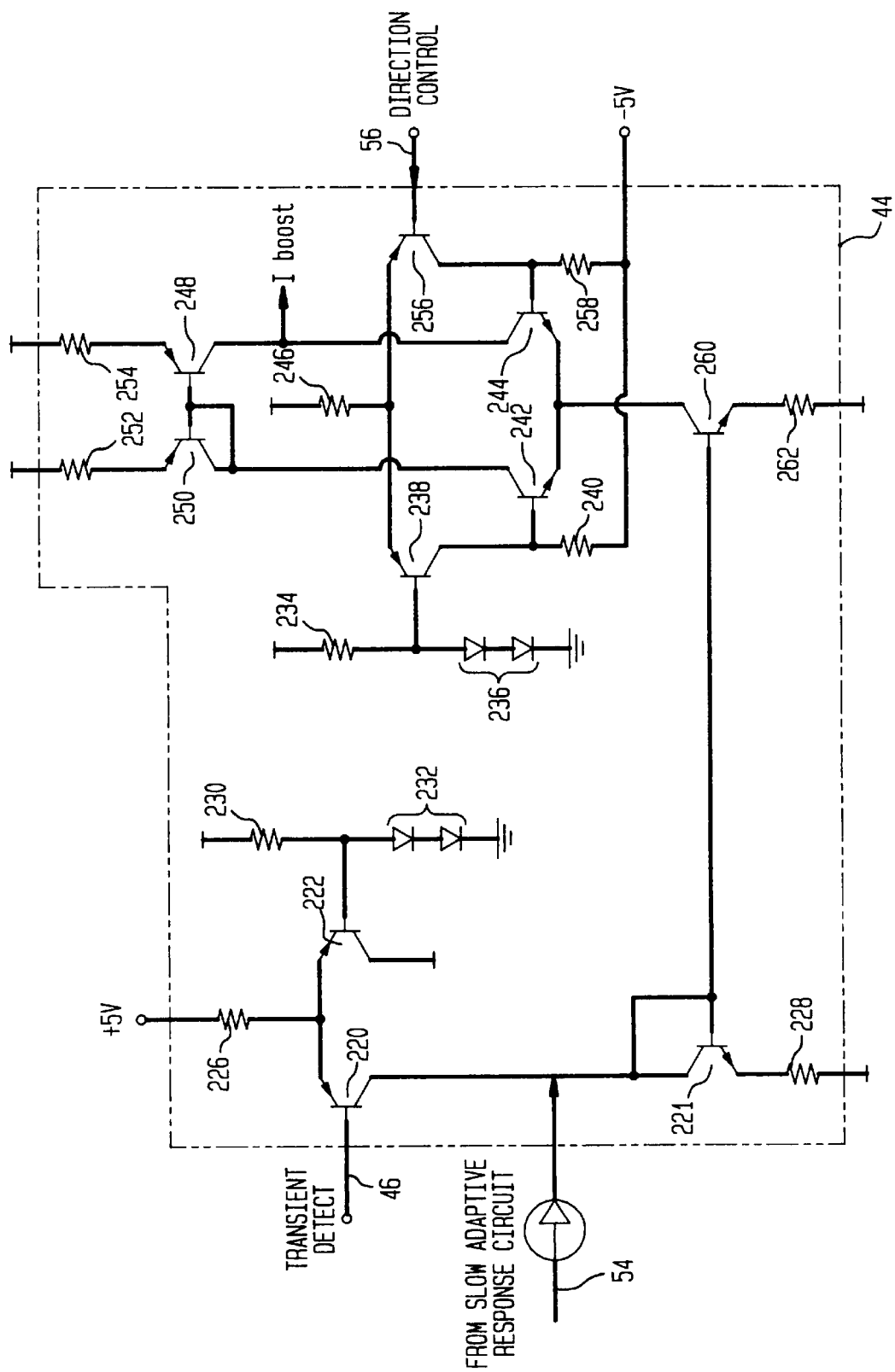
FIG. 5 is a schematic diagram of a current boost circuit employed in an adaptive controller in accordance with one embodiment of the present invention.

FIG. 5 is a schematic diagram of a current boost circuit in accordance with the present invention, such as 44, although the invention is not limited in scope to this current boost circuit. Current boost circuit 44 includes an emitter coupled transistor pair comprising transistors 220 and 222. The emitter terminal of this transistor pair is coupled to a power supply signal via resistor 226. The base terminal of transistor 220 is configured to receive a transient detect signal via line 46. The base terminal of transistor 222 is configured to receive a reference voltage defined by a serially coupled diode pair 232. The emitter terminal of transistor 220 is configured to receive a current signal from slow adaptive response circuit via line 54. Thus the amplitude of current signal that flows through the collector terminal of transistor 220 depends among other things on the resistance of resistor 226 and the amplitude of current signal level received from the slow adaptive response circuit 42 (FIG. 4).

The collector terminal of transistor 220 is coupled to a current mirror comprising transistors 224 and 260. The collector terminal of transistor 260 is coupled to the emitter terminal of an emitter coupled transistor pair comprising of transistors 242 and 244. The collector terminal of transistor 242 is coupled to another current mirror comprising transistors 250 and 248. The collector terminal of transistor 248 is connected to a slew rate compensation current terminal, which is employed to provide the slew rate compensation current signal generated by current boost circuit 44. The collector terminal of transistor 244 is also coupled to the collector terminal of transistor 248.

A separate emitter coupled transistor pair comprising transistors 238 and 256 are configured to control the direction of current flow in and out of the slew rate compensation current terminal. The emitter terminals of transistors 238 and 256 are coupled together and to a reference voltage signal through resistor 246. The collector terminals of transistors 238 and 256 are coupled to a power supply voltage signal via transistors 240 and 238, respectively. The base terminal of transistor 256 is configured to receive the change direction signal via line 56. The base terminal of transistor 238 is configured to receive a reference voltage signal defined by a serially coupled diode pair 236. The collector terminal of transistor 238 is also coupled to the base terminal of transistor 242. Similarly, the collector terminal of transistor 256 is coupled to the base terminal of transistor 244.

During operation the amplitude of the boost current signal is defined among other things by the amplitude of the current signal received from slow adaptive response circuit 42, and the value of resistor 236. The direction of the boost current signal is determined by change direction control signal. For example, when the change direction control signal is "high," transistor 256 turns "off" and transistor 238 turns "on." As a result, the current flowing through the collector terminal of transistor 238 causes the voltage level at the base terminal of transistor 242 to go sufficiently high so as to turn transistor 242 "on." This causes the current mirror formed by transistors 250 and 248 to provide a boost current signal flowing out of the slew rate compensation current terminal. In the alternative, when the change direction control signal is "low," transistor 256 turns "on" and transistor 238 turns "off." As a result, the current flowing through the collector terminal of transistor 256 causes the voltage level at the base terminal of transistor 244 to go sufficiently high so as to turn transistor 244 "on." As a result, the slew rate compensation current signal flows in from the slew rate compensation current terminal.

Thus, an embodiment of an adaptive controller in accordance with the present invention addresses problems associated with prior art controllers. For example, in accordance with the principles of the present invention, an adaptive controller is able to track a slow varying input signal with a high degree of accuracy, while it is also able to track a rapidly varying input signal with a substantially fast recovery time. Furthermore, when used in a communication system employing a diversity antenna, the adaptive controller does not require an attenuator to maintain the power signal level generated in the antennas below a given threshold. It is noted that in accordance with one embodiment of the present invention the adaptive controller may be employed in an integrated circuit arrangement.

The present adaptive controller is well suited in use with narrow-band transmission schemes such as the IS-54/-136 Time Division Multiple Access (TDMA) protocol. It is noted that the present adaptive controller may also be employed in spread-spectrum protocols. However, in a spread-spectrum environment, because the bandwidth of the input signal greatly exceeds the coherence bandwidth of the transmission channel, a broadband measurement of the received signal power may lead to a less than satisfactory control behavior. Thus, it is preferable to employ a baseband estimate of the received signal to noise ration SNR, as a power feedback signal.

While only certain features of the invention have been illustrated and described herein, many modifications, substitutions, changes or equivalents will now occur to those skilled in the art. It is therefore to be understood that the appended claims are intended to cover all such modifications and changes that fall within the true spirit of the invention.

We claim:

1. An adaptive feedback controller configured to substantially reduce an error control signal defined by the difference between a command signal and the output signal of a controlled device, said adaptive controller comprising:

a step generator circuit configured to provide a control signal, said control signal employed to vary the input signal received by said controlled device, said control signal being substantially in the shape of a ramp signal having a given slew rate; and an adaptive slew rate computation circuit coupled to said step generator said adaptive slew rate computation circuit configured to generate a transient detect signal when said error control signal is decreasing for a specified period of time, such that said adaptive slew rate computation circuit provides a slew rate compensation signal to said step generator to increase the slew rate of said control signal, when said controlled device is responding to a substantially fast varying input signal.

2. An adaptive feedback controller in accordance with claim 1, wherein said adaptive slew rate computation circuit further comprises a transient detect circuit, responsive to changes of said error control signal and configured to generate said transient detect signal, when said error control signal is decreasing for said specified period of time.

3. An adaptive feedback controller in accordance with claim 2, wherein said adaptive slew rate computation circuit further comprises a slow adaptive response circuit configured to receive said control signal generated by said step generator, said slow adaptive response circuit generating at its output terminal a signal corresponding to the time average of the first derivative of said control signal generated by said step generator.

4. The adaptive feedback controller in accordance with claim 3, further comprising a current boost circuit coupled to an output terminal of said transient detect circuit and an output terminal of said slow adaptive response circuit, said current boost circuit configured to generate said slew rate compensation signal.

5. The adaptive feedback controller in accordance with claim 4, wherein said slow adaptive response circuit is deactivated when said transient detect circuit generates a fast transient indication signal.

6. The adaptive feedback controller in accordance with claim 3, further comprising a sign detector circuit configured to receive said error control signal and in response thereto generate a change-direction signal when the sign of said error control is the same as the sign of the derivative of said error control signal, indicating that said error control is increasing.

7. The adaptive feedback controller in accordance with claim 6, wherein an input terminal of said transient detect circuit is configured to an output terminal of said sign detector circuit so as to generate said fast transient indication signal when said change-direction signal is not generated for a given period of time.

8. The adaptive feedback controller in accordance with claim 7, wherein said step generator is configured to receive said change-direction signal, said step generator reversing the direction of said ramp signal, when said change-direction signal is generated by said sign detector circuit.

9. The adaptive feedback controller in accordance with claim 8, wherein said current boost circuit is configured to receive said change-direction signal so that the direction of said slew rate compensation current signal generated by said current boost circuit is the same as the direction of said ramp signal generated by said step generator.

10. The invention in accordance with claim 9, wherein said adaptive controller is arranged in an integrated circuit.

11. A communication receiver employing an adaptive feedback controller comprising:

at least two antennas configured to receive signals transmitted by a transmitter;

a phase rotator coupled to at least one of said antennas, so as to vary the phase of an incoming signal received by said antenna;

a first combiner configured to receive the signals received by said antennas, and generate an output signal corresponding to the combination of said received signals;

a second combiner configured to receive the output signal generated by said first combiner and a command signal representing a desired signal level, said second combiner generating an error control signal;

an adaptive feedback controller configured to receive said error control signal, and in response thereto generate a control signal, so as to vary the phase shift generated by said phase rotator, said adaptive feedback controller further comprising a step generator circuit configured to provide a control signal, said control signal employed to vary the input signal received by said controlled device, said control signal being substantially in the shape of a ramp signal having a given slew rate; and an adaptive slew rate computation circuit coupled to said step generator said adaptive slew rate computation circuit configured to generate a transient detect signal when said error control signal is decreasing for a specified period of time, such that said adaptive slew rate computation circuit provides a boost signal to said step generator to increase the slew rate of said control signal, when said controlled device is responding to a substantially fast varying input signal.

12. An adaptive feedback controller in accordance with claim 11, wherein said adaptive slew rate computation circuit further comprises a transient detect circuit, responsive to changes of said error control signal and configured to generate said transient detect signal, when said error control signal is decreasing for said specified period of time.

13. An adaptive feedback controller in accordance with claim 12, wherein said adaptive slew rate computation circuit further comprises a slow adaptive response circuit configured to receive said control signal generated by said step generator, said slow adaptive response circuit generating at its output terminal a signal corresponding to the time average of the first derivative of said control signal generated by said step generator.

14. The adaptive feedback controller in accordance with claim 13, further comprising a current boost circuit coupled to an output terminal of said transient detect circuit and an output terminal of said slow adaptive response circuit, said current boost circuit configured to generate said slew rate compensation current signal.

15. The adaptive feedback controller in accordance with claim 14, wherein said slow adaptive response circuit is deactivated when said transient detect circuit generates a fast transient indication signal.

16. The adaptive feedback controller in accordance with claim 13, further comprising a sign detector circuit configured to receive said error control signal and in response thereto generate a change-direction signal when the sign of said error control is the same as the sign of the derivative of said error control signal, indicating that said error control is increasing.

17. The adaptive feedback controller in accordance with claim 16, wherein an input terminal of said transient detect circuit is configured to an output terminal of said sign detector circuit so as to generate said fast transient indication signal when said change-direction signal is not generated for a given period of time.

18. The adaptive feedback controller in accordance with claim 17, wherein said step generator is configured to receive said change-direction signal, said step generator reversing the direction of said ramp signal, when said change-direction signal is generated by said sign detector circuit.

19. The adaptive feedback controller in accordance with claim 18, wherein said current boost circuit is configured to receive said change-direction signal so that the direction of said slew rate compensation current signal generated by said current boost circuit is the same as the direction of said ramp signal generated by said step generator.

20. The invention in accordance with claim 19, wherein said adaptive controller is arranged in an integrated circuit.

21. A method for adaptively controlling a plant process by generating a control signal so as to reduce a resulting error control signal defined by the difference between a command signal and the output signal of said plant process, said method comprises the steps of:

generating a control signal by a step generator and providing said control signal to said plant process, such that said control signal varies in a given direction in accordance with a given slew rate;

subtracting the output signal generated by said plant process from a command signal level so as to periodically evaluate said resulting error control signal;

increasing the slew rate of said control signal when the input signal to said plant process is perceived as a substantially rapidly varying transient when said error control signal continues to decrease for a specified period of time;

decreasing the slew rate of said control signal when the input signal to the plant process is perceived as a slowly varying signal.

22. The method in accordance with claim 21 further comprising the step of reversing said given direction of said control signal when said error control signal increases.

23. The method in accordance with claim 22 wherein said step of increasing the slew rate further comprises the step of detecting a transient condition and in response thereto generating a fast transient indication signal.

24. The method in accordance with claim 23, wherein said step of decreasing the slew rate further comprises the step of receiving said control signal generated by said step generator, and generating a signal corresponding to the time average of the first derivative of said control signal generated by said step generator.

25. The method in accordance with claim 23 further comprising the step of discontinuing the generation of said slow adaptive response current signal when said fast transient indication signal is generated.

\* \* \* \* \*